(12) United States Patent
Ahtikari

(10) Patent No.: US 11,059,381 B2
(45) Date of Patent: Jul. 13, 2021

(54) CONTROLLING ELECTRIC VEHICLE CHARGING CURRENTS

(71) Applicant: LIIKENNEVIRTA OY / VIRTA LTD, Helsinki (FI)

(72) Inventor: Jussi Ahtikari, Helsinki (FI)

(73) Assignee: LIIKENNEVIRTA OY/VIRTA LTD, Helsinki (FI)

( * ) Notice: Subject to any disclaimer, the term of this patent is extended or adjusted under 35 U.S.C. 154(b) by 0 days.

(21) Appl. No.: 16/764,337

(22) PCT Filed: Nov. 6, 2018

(86) PCT No.: PCT/FI2018/050808
§ 371 (c)(1),
(2) Date: May 14, 2020

(87) PCT Pub. No.: WO2019/097115
PCT Pub. Date: May 23, 2019

(65) Prior Publication Data
US 2020/0376976 A1 Dec. 3, 2020

(30) Foreign Application Priority Data

Nov. 15, 2017 (FI) ..................................... 20176024

(51) Int. Cl.
*B60L 53/67* (2019.01)
*B60L 53/68* (2019.01)
(Continued)

(52) U.S. Cl.
CPC .............. *B60L 53/67* (2019.02); *B60L 53/68* (2019.02); *G05B 19/042* (2013.01);
(Continued)

(58) Field of Classification Search
CPC .... B60L 53/67; B60L 53/68; H02J 13/00022; G05B 19/042; G05B 2219/2639
See application file for complete search history.

(56) References Cited

U.S. PATENT DOCUMENTS

| 2010/0134067 A1 | 6/2010 | Baxter |
| 2012/0078430 A1* | 3/2012 | Fan .......................... G06F 1/329 700/295 |

(Continued)

FOREIGN PATENT DOCUMENTS

| DE | DE-102011084216 A1 * | 4/2013 | ............. B60L 53/63 |
| EP | 3016238 A1 | 5/2016 | |
| WO | WO 2017/011373 | 1/2017 | |

OTHER PUBLICATIONS

Finnish Application No. 20176024 Search Report dated Feb. 1, 2018 (2 pages).

(Continued)

*Primary Examiner* — Santosh R Poudel
(74) *Attorney, Agent, or Firm* — Alston & Bird LLP

(57) ABSTRACT

According to an aspect, there is provided a computer device configured to control charging currents of at least a first charging station of an electric vehicle and at least a second charging station of an electric vehicle by internet based communications, wherein the charging stations are from different manufacturers, and wherein the charging stations are wirelessly coupled to the computer device.

11 Claims, 16 Drawing Sheets

(51) Int. Cl.
H02J 13/00 (2006.01)
G05B 19/042 (2006.01)

(52) U.S. Cl.
CPC .. H02J 13/00002 (2020.01); H02J 13/00022 (2020.01); G05B 2219/2639 (2013.01)

(56) References Cited

U.S. PATENT DOCUMENTS

| | | | |
|---|---|---|---|
| 2012/0146583 A1* | 6/2012 | Gaul | B60L 53/63 |
| | | | 320/109 |
| 2012/0277927 A1 | 11/2012 | Watkins et al. | |
| 2014/0062401 A1 | 3/2014 | Gadh et al. | |
| 2014/0084874 A1 | 3/2014 | Eger | |
| 2014/0184170 A1 | 7/2014 | Jeong | |
| 2014/0225565 A1 | 8/2014 | Eger et al. | |
| 2016/0082856 A1* | 3/2016 | Baxter | B60L 3/0084 |
| | | | 320/109 |

OTHER PUBLICATIONS

PCT/FI2018/050808 International Search Report dated May 23, 2019 issued by ISA/EP (4 pages).
PCT/FI2018/050808 Written Opinion of the International Preliminary Examining Authority (IPEA/EP) dated Oct. 9, 2019 (7 pages).
PCT/FI2018/050808 International Preliminary Report on Patentability issued by IPEA/EP dated Mar. 11, 2020 (17 pages).

* cited by examiner

CONTROLLING ELECTRIC VEHICLE CHARGING CURRENTS

CROSS-REFERENCE TO RELATED APPLICATIONS

This application is a national phase entry of International Application No. PCT/FI2018/050808, filed Nov. 6, 2018, which claims priority to Finnish Application No. 20176024, filed Nov. 15, 2017, the entire contents of which are incorporated herein by reference.

TECHNICAL FIELD

The present application relates to the field of charging, and more particularly to the controlling of charging power of electric vehicles.

BACKGROUND

As the number of electric vehicles is increasing, also the demand for charging stations is increasing gradually. The power demand of electric vehicles poses challenges for the grid capacity, and charging currents need to be balanced based on the capacity of the supply network in order to avoid, for example, blackouts, as the demand can rise high when multiple electric vehicles are charging simultaneously.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

It is an object to provide a solution for controlling electric vehicle charging currents. The object is achieved by the features of the independent claims. Further implementation forms are provided in the dependent claims, the description and the figures.

According to a first aspect, there is provided a computer device configured to control charging currents of at least a first charging station of an electric vehicle and at least a second charging station of an electric vehicle by internet based communications; wherein the charging stations are from different manufacturers; and wherein the charging stations are wirelessly coupled to the computer device. The provided computer device enables managing and optimizing the charging currents provided for electric vehicles regardless of the location or models of the charging stations.

In a further implementation form of the first aspect, the charging stations are situated at a different location than the computer device. Thus, operations performed by the computer device are not restricted by locations of the charging stations, and distances may be large.

In a further implementation form of the first aspect, the computer device is further configured to determine groups, each group comprising at least one charging station, and each charging station belonging to one group; and control charging currents by setting a maximum current for each group and each charging station. The implementation enables ensuring that maximum current capacities may not be exceeded, and that the highest available charging current is provided for each electric vehicle.

In a further implementation form of the first aspect, the groups are subgroups, and the computer device is further configured to determine parent groups, each parent group comprising at least one subgroup, and each subgroup belonging to one parent group; and control charging currents by setting a maximum current for each parent group. The implementation enables ensuring that maximum current capacities may not be exceeded when one or more electric vehicles are charging, and enables adjusting the charging power provided for the groups.

In a further implementation form of the first aspect, the parent group comprising at least one subgroup is a subgroup to another parent group. The implementation enables adjusting the charging power provided for the groups.

In a further implementation form of the first aspect, each charging station, each subgroup and each parent group comprises an original maximum current and a dynamic maximum current, wherein the original maximum current comprises a maximum current capacity, and the dynamic maximum current depends on the number of charging electric vehicles. The implementation provides for dynamic controlling of the maximum currents depending on the load situation.

In a further implementation form of the first aspect, the computer device is further configured to store data about active charging stations with the electric vehicles, and inactive charging stations without electric vehicles; obtain information about at least one new electric vehicle requesting to at least one of start charging or stop charging, and the identity of the charging station with the requesting new electric vehicle; and update the data about active and inactive charging stations. The implementation provides for keeping track of the number of electric vehicles at the charging stations.

In a further implementation form of the first aspect, the computer device is further configured, in response to the updated data, to initiate determining if load needs to be adjusted; and dispatch a confirmation of the request in response to the set new dynamic maximum currents. The implementation provides for reacting to the changes in the number of electric vehicles at the charging stations, and confirming that the maximum available charging power is provided for every charging electric vehicle after the number of electric vehicles has changed.

In a further implementation form of the first aspect, determining the need for load adjustment is initiated for each group comprising at least one subgroup, wherein the determining comprises checking if a number of subgroups in relation to at least one active charging station has changed; and in response to the changed number of the subgroups in relation to at least one active charging station, initiating determining new dynamic maximum currents. The implementation provides for determining if the change in the number of electric vehicles causes a need for load adjustment among groups.

In a further implementation form of the first aspect, determining the need for load adjustment comprises checking if there is at least one active charging station left in the group in which the new electric vehicle requested to stop charging; and initiating determining new dynamic maximum currents for the active charging stations left in the group.

In a further implementation form of the first aspect, determining the need for load adjustment comprises checking the dynamic maximum current of the group in which the charging station with the electric vehicle requesting to start charging is located; determining the combined dynamic maximum currents of the active charging stations currently charging the electric vehicles in the group; checking the dynamic maximum current of the active charging station with the electric vehicle requesting to start charging; and initiating determining new dynamic maximum currents for the active charging stations if the combined dynamic maximum currents of the active charging stations currently charging the electric vehicles and the dynamic maximum current of the active charging station with the electric vehicle requesting to start charging exceed the dynamic maximum current of the group. The implementation provides for determining if the change in the number of electric vehicles causes a need for load adjustment within the group.

In a further implementation form of the first aspect, determining new dynamic maximum currents comprises comparing the original maximum currents of the active charging stations and an evenly divided dynamic maximum current of the group between the active charging stations of the group, and selecting the maximum current with the lower value for each active charging station; and setting the new dynamic maximum current for each active charging station based on the determination. This enables ensuring that maximum available current is provided for each electric vehicle at all times while ensuring that maximum capacities are not exceeded.

In a further implementation form of the first aspect, determining new dynamic maximum currents comprises comparing the original maximum currents of the groups in relation to at least one active charging station and an evenly divided dynamic maximum current of the parent group between the groups of the parent group that are in relation to the active charging stations, and selecting the maximum current with the lower value for each group in relation to the active charging stations; and setting the new dynamic maximum current for each group in relation to at least one active charging station based on the determination. This enables ensuring that maximum available current is provided for each group comprising charging electric vehicles at all times while ensuring that maximum capacities are not exceeded.

In a further implementation form of the first aspect, the internet based communications comprise an open charge point protocol, OCPP, an open smart charging protocol, OSCP, and/or a charging station manufacturer specific protocol. Thus, communication and control of the charging currents is not limited by a certain protocol.

In a further implementation form of the first aspect, the computer device comprises at least one processor configured to control operations of the computer device; a communications module configured to communicate with at least the first and the second charging station; and at least one memory coupled to the at least one processor and the communications module, and configured to store program instructions that, when executed by the at least one processor, cause the device to perform the control operations.

According to a second aspect, there is provided a method, the method comprising controlling the charging currents of at least a first charging station of an electric vehicle and at least a second charging station of an electric vehicle by internet based communications; wherein the charging stations are from different manufacturers; and wherein the charging stations are wirelessly coupled to the computer device.

According to a third aspect, a computer program is provided, comprising program code which, when executed by at least one processing unit, causes the at least one processing unit to perform a method according to the second aspect.

In an implementation form of the third aspect, the computer program is embodied on a computer readable medium.

Many of the attendant features will be more readily appreciated as they become better understood by reference to the following detailed description considered in connection with the accompanying drawings.

DESCRIPTION OF THE DRAWINGS

The present description will be better understood from the following detailed description read in light of the accompanying drawings, wherein.

Like references are used to designate like parts in the accompanying drawings.

DETAILED DESCRIPTION

The detailed description provided below in connection with the appended drawings is intended as a description of the embodiments and is not intended to represent the only forms in which the embodiment may be constructed or utilized. However, the same or equivalent functions and structures may be accomplished by different embodiments.

According to an embodiment, a computer server may control the charging power of each electric vehicle, EV. The charging power control may be based on the number of EVs which are charging at the same time. The charging control is dynamic, such as being based on dynamic load management, DLM. Consequently, the charging capacity of the whole charging network and the number of EVs to be charged can be considered. The goal of the DLM may be to make sure that maximum power output is never exceeded for the grid, and yet to dynamically provide high charging power to the EVs. The charging is dynamic, so that the number of EVs in the grid, and the position of each EV in the grid can be taken into account. The situation may change on the fly, for example an EV may stop charging or a new EV may start charging at a certain location of the grid, and the computer server can control the charging so that the new situation is detected and managed for the grid with respect to DLM.

Each charging unit, such as a group unit or a charging station, comprises a communication module. The computer server communicates with the modules by the internet. This may be wireless or wired communication. The computer server may operate at the cloud. The computer server is configured to communicate with the communication modules using various protocols. Consequently, the charging stations may be manufactured by different manufacturers, and the communication can be based on an EV charging protocol or a manufacturer specific protocol.

Figure 1:
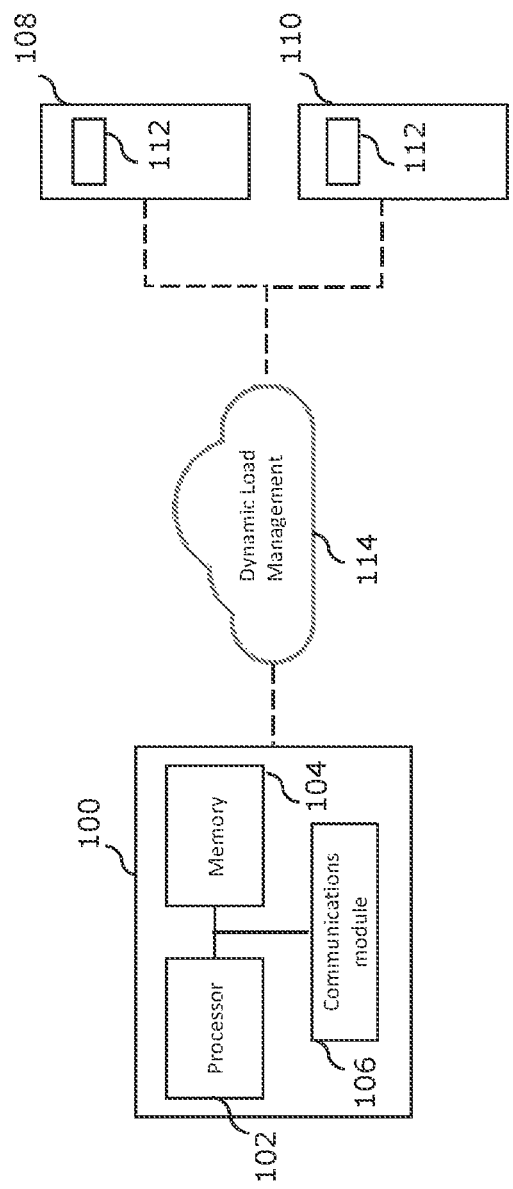
FIG. 1 illustrates a schematic representation of a block diagram of a computer device for dynamic load management according to an embodiment.

FIG. 1 illustrates a schematic representation of a block diagram of a computer device 100 for dynamic load management according to an embodiment. In the embodiment, the computer device 100 may control charging currents of charging stations by internet based communications.

In FIG. 1, the computer device 100 is configured to control charging currents of at least a first charging station 108 of an EV, and at least a second charging station 110 of an EV by internet based communications. The computer device 100 may comprise at least one processor 102 connected to at least one memory 104 and a communications module 106. The at least one memory 104 may comprise at least one computer program which, when executed by the processor 102 or processors, causes the computer device 100 to perform the programmed functionality. Dynamic load management operations 114 may be delivered from a cloud. At least the first and at least the second charging station 108, 110 comprise communications modules 112, and the computer device 100 may be configured to communicate with the communication modules 112. The charging stations 108, 110 may be from different manufacturers. The charging stations 108, 110 may be wirelessly coupled to the computer device 100. According to an embodiment, the charging stations 108, 110 may be situated at a different location than the computer device 100. The charging stations 108, 110 may be wirelessly coupled to the computer device 100 by internet, and not by physical cabling. Thus, the distances of the locations may be large. For example, the charging stations 108, 110 may locate in the same building, in the same city, in another city, or even in another country, than the computer device 100.

The computer device 100 may control the charging currents of the first charging station 108 and the second charging station 110 by increasing or decreasing the maximum current provided for charging based on the number of EVs charging at the same time. The computer device 100 may be, for example, a cloud server or a distributed system. The internet based communications may comprise an open charge point protocol, OCPP, an open smart charging protocol, OSCP, and/or a charging station manufacturer specific protocol. This enables controlling the charging currents remotely, and therefore no additional hardware or new physical installations are required. As the charging stations 108, 110 may be independent of a certain vendor or model, the electricity demand of the EVs charging can be managed more comprehensively.

Figure 2A:
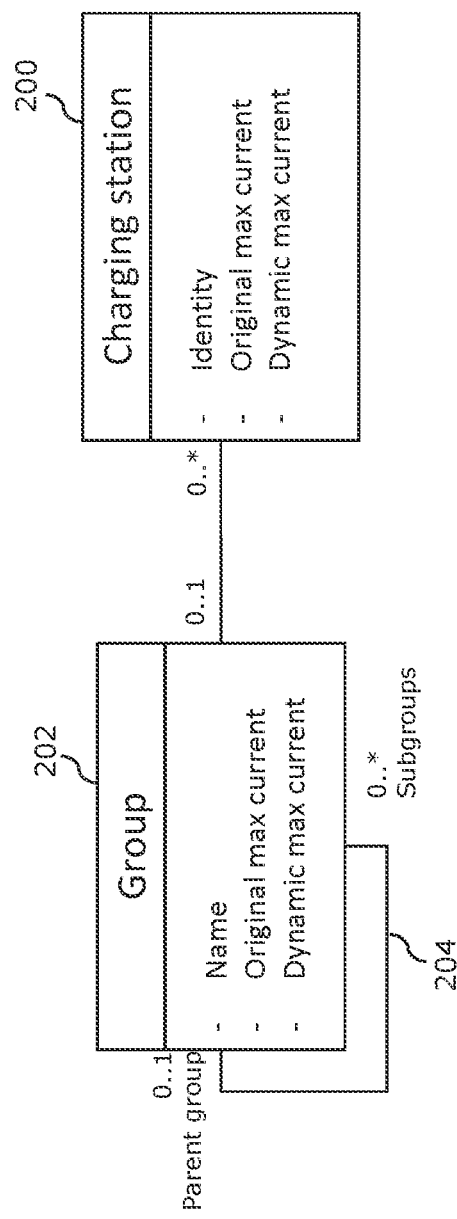
FIG. 2A illustrates a schematic representation of a block diagram of a grouping of charging stations according to an embodiment.

FIG. 2A illustrates a schematic representation of a block diagram of a grouping of charging stations according to an embodiment. The charging stations may be grouped into groups, and further into larger groups. Thus, the charging capacities can be managed more appropriately by taking the restrictions into account on different levels.

In FIG. 2A, the computer device 100 is further configured to determine groups 202, each group 202 comprising at least one charging station 200, the at least one charging station 200 being part of no more than one group 202, and to control charging currents by setting a maximum current for each group 202 and each charging station 200. Further, in an embodiment, the groups 202 may be subgroups. The computer device 100 may be configured to determine parent groups 204, each parent group 204 comprising at least one subgroup 202, and each subgroup 202 being part of no more than one parent group 204, and to control charging currents by setting a maximum current for each parent group 204.

Each charging station 200 may have an ID, and each subgroup 202, and each parent group 204, may have a name to identify the charging stations 200, the subgroups 202, and the parent groups 204. For example, a subgroup 202 may be named by its location, such as by a district or a city in the area of which all the charging stations 200 within the subgroup 202 are located.

In an embodiment, each parent group 204, each subgroup 202, and each charging station 200 may comprise an original maximum current and a dynamic maximum current. The original maximum current may comprise a maximum current capacity. The dynamic maximum current may depend on the number of charging EVs. The original maximum currents may be set based on the fuse sizes behind of which each charging station 200, each subgroup 202, or parent group 204 is located, or the original maximum currents may be set based on other criteria for determining maximum capacities. The computer device 100 may control the original maximum currents and the dynamic maximum currents via communications modules 112 by the internet.

Figure 2B:
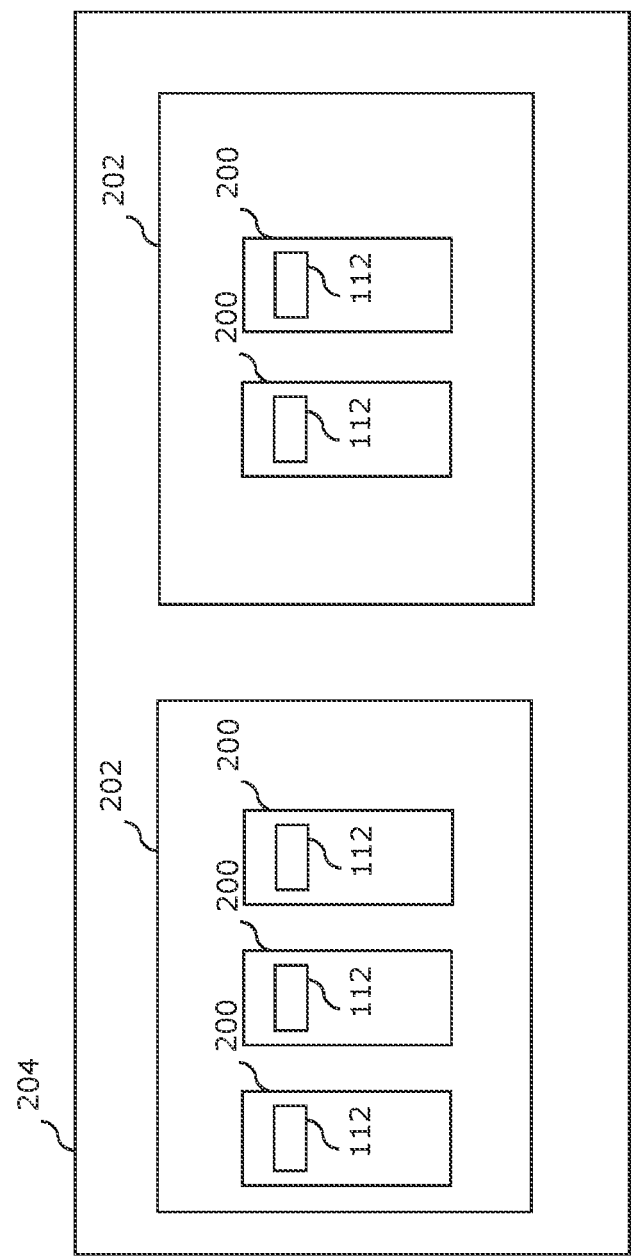
FIG. 2B illustrates a schematic representation of a block diagram of a grouping of charging stations according to another embodiment.

FIG. 2B illustrates another schematic representation of a block diagram of a grouping of charging stations 200 according to an embodiment. FIG. 2B illustrates how each subgroup 202 may comprise a different number of charging stations 200. Each subgroup 202 comprises at least one charging station 200. Each charging station 200 comprises a communications module 112 for communicating with the computer device 100. Further, the subgroups 202 are a part of a parent group 204. In an embodiment, a parent group 204 may have many subgroups 202, and one subgroup 202 may have only one parent group 204. Further, in another embodiment, a parent group 204 may be a part of another parent group 204, and thus the parent group 204 may be a subgroup 202 to another parent group 204.

The computer device 100 may be configured to perform operations of dynamic load management, as illustrated in FIGS. 3-7 in more detail.

Figure 3:
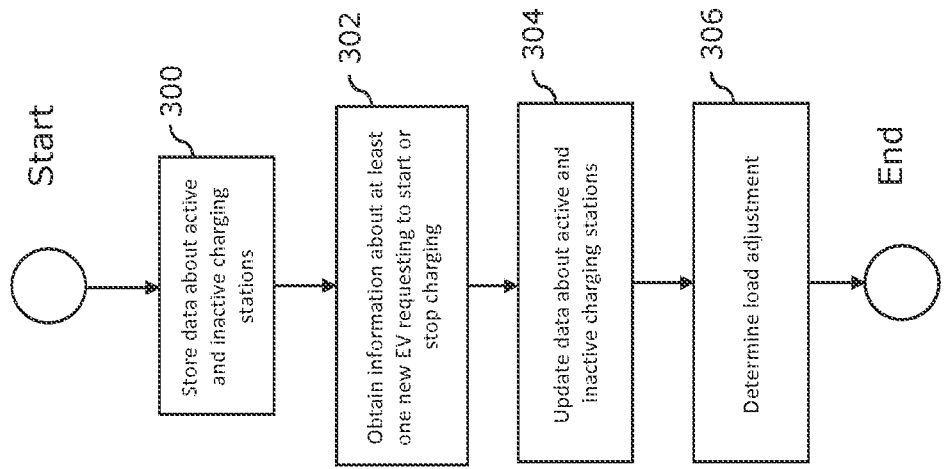
FIG. 3 illustrates a schematic representation of a process diagram of dynamic load management according to an embodiment.

FIG. 3 illustrates a schematic representation of a process diagram of dynamic load management according to an embodiment. The computer device 100 may store data about active charging stations 200 to keep track of the number of charging EVs for operating dynamic load management.

The computer device 100 may be configured to store data about active charging stations 200 with an EV, and inactive charging stations 200 without an EV at operation 300. At operation 302, information about at least one new EV requesting to at least one of start charging or stop charging is obtained. Also, the obtained information comprises the ID of the charging station 200 with the requesting new EV. In response to the obtained information, data about active and inactive charging stations 200 is updated at operation 304. In response to the updated data, load adjustment is determined at operation 306.

Figure 4:
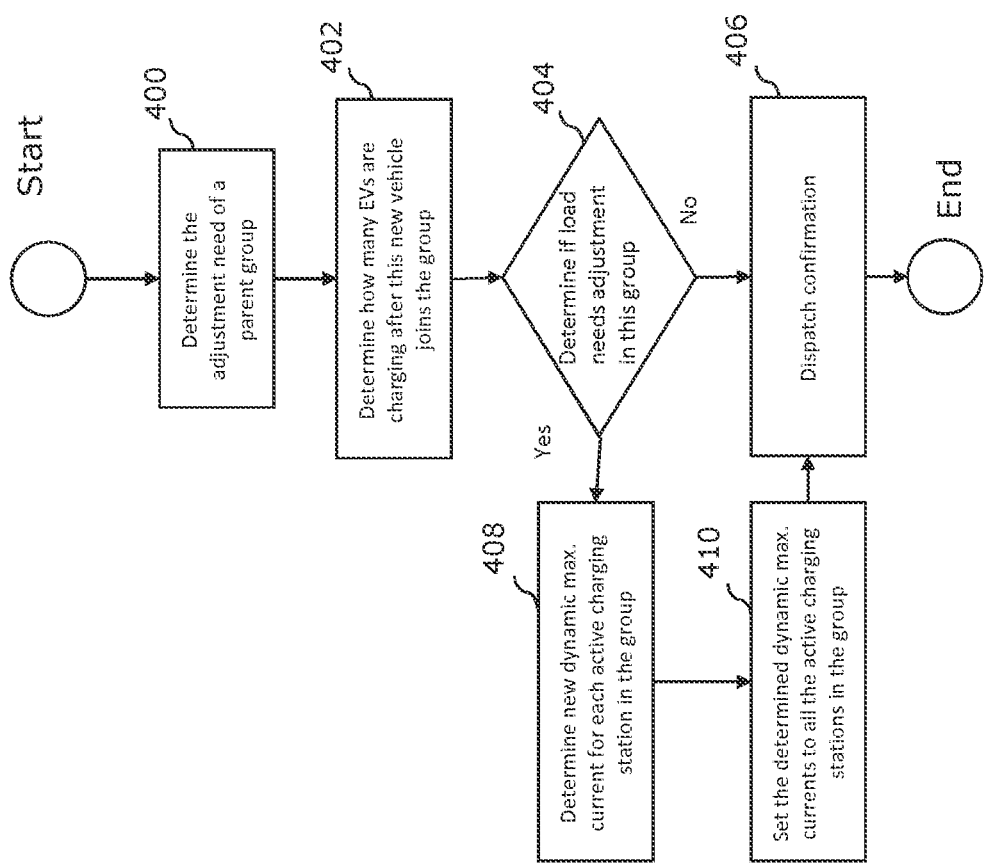
FIG. 4 illustrates a schematic representation of a process diagram of dynamic load management when a new electric vehicle has requested to start charging according to an embodiment.

FIG. 4 illustrates a schematic representation of a process diagram of dynamic load management when a new electric vehicle has requested to start charging according to an embodiment. The illustrated process is initiated when at least one new EV requests to start charging at a charging station 200.

At operation 400, the load adjustment need of a parent group 204 is determined. If a need for adjustment is determined, a new dynamic maximum current provided by the parent group 204 may be determined before making any changes in subgroups.

Determining the number of EVs charging in a subgroup 202 after the new requesting EV joins the subgroup 202 is performed at operation 402.

At operation 404, the need for load adjustment in the subgroup 202 is determined. First, the current dynamic maximum current of the subgroup 202 in which the charging station 200 with the EV requesting to start charging is located is checked. Thereafter, determining the combined dynamic maximum currents of the active charging stations 200 with currently charging EVs in the subgroup 202 is performed. The current dynamic maximum current of the active charging station 200 with the EV requesting to start charging is checked. If the combined dynamic maximum currents of the active charging stations 200 with currently charging EVs and the current dynamic maximum current of the charging station 200 with the EV requesting to start charging exceed the current dynamic maximum current of the subgroup 202, determining a new dynamic maximum current for each active charging station 200 in the subgroup 202 is initiated at operation 408. Otherwise, there is no need to set new dynamic maximum currents, and a confirmation allowing the new EV to start charging is dispatched at operation 406.

Determining a new dynamic maximum current for each active charging station 200 in the subgroup 202 is performed at operation 408. The determination is performed by comparing the original maximum current of the active charging stations 200 and an evenly divided dynamic maximum current of the subgroup 202 between the active charging stations 200 of the subgroup 202. Then, the maximum current with the lower value for each active charging station 200 is selected. Based on the determination at operation 408, the new dynamic maximum current is set for each active charging station 200 at operation 410. After the new dynamic maximum currents for each active charging station 200 in the subgroup 202 are set, a confirmation is dispatched at operation 406 in order to allow the new EV to start charging.

Figure 5:
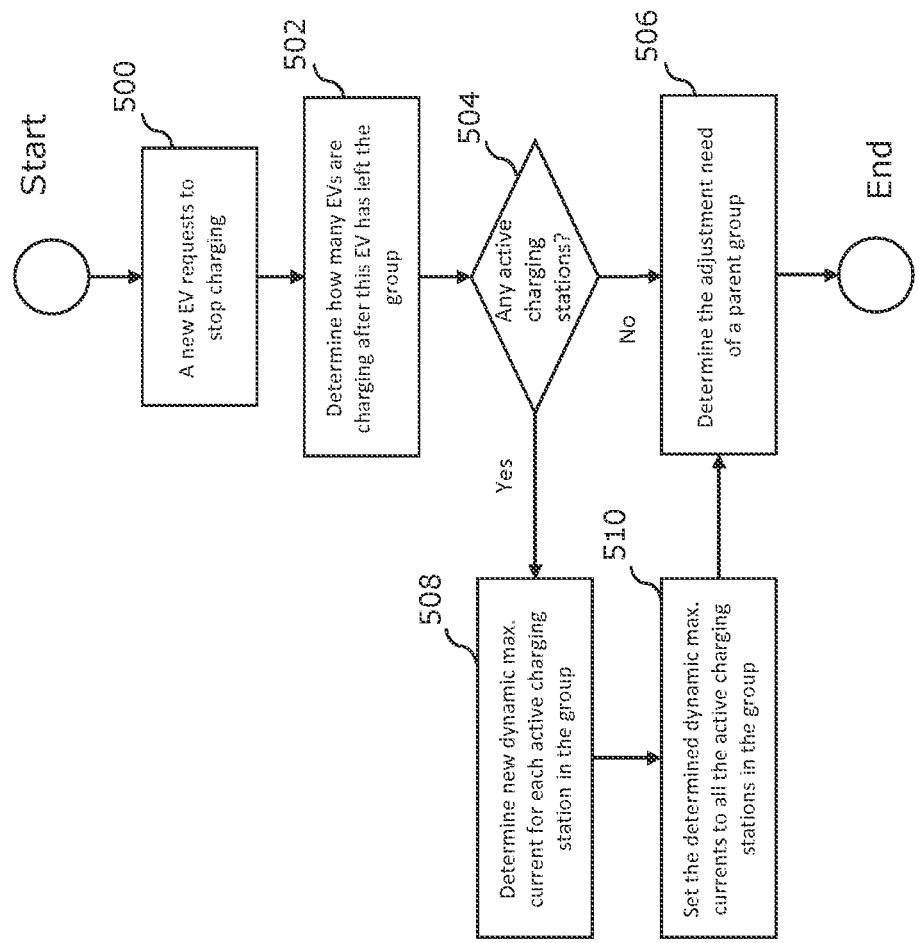
FIG. 5 illustrates a schematic representation of a process diagram of dynamic load management when a new electric vehicle has requested to stop charging according to an embodiment.

FIG. 5 illustrates a schematic representation of a process diagram of dynamic load management when a new electric vehicle has requested to stop charging according to an embodiment. The illustrated process is initiated when at least one new EV requests to stop charging at a charging station 200.

At operation 500, information about at least one new EV requesting to stop charging is obtained. Then, the number of EVs charging in the subgroup 202 after the at least one new EV has stopped charging is determined at operation 502.

At operation 504, if there are no longer any active charging stations 200 in the subgroup 202, determining the adjustment need of a parent group 204 is performed at operation 506. If there is at least one active charging station 200 left in the subgroup 202 after the at least one EV has stopped charging, a new dynamic maximum current is determined for each active charging station 200 in the subgroup 202 at operation 508.

Determining a new dynamic maximum current for each active charging station 200 in the subgroup 202 is performed at operation 508. The determination is performed by comparing the original maximum current of the active charging stations 200 and an evenly divided dynamic maximum current of the subgroup 202 between the active charging stations 200 of the subgroup 202. Then, the maximum current with the lower value for each active charging station 200 is selected. Based on the determination at operation 508, the new dynamic maximum current is set for each active charging station 200 at operation 510. Thereafter, the adjustment need of the parent group 204 is determined at operation 506.

Figure 6:
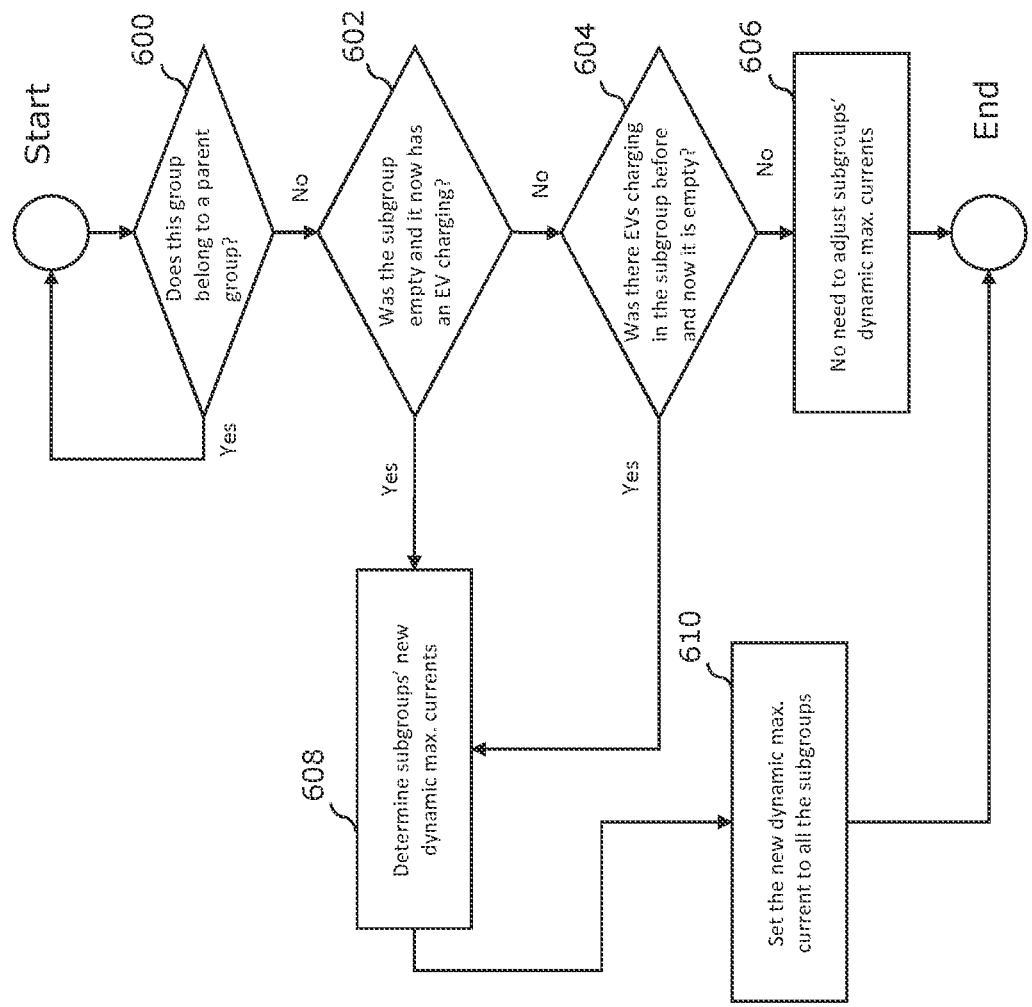
FIG. 6 illustrates a schematic representation of a process diagram of dynamic load management where the load adjustment need is determined in a parent group according to an embodiment.

FIG. 6 illustrates a schematic representation of a process diagram of dynamic load management where the load adjustment need is determined in a parent group 204 according to an embodiment. The illustrated process responds to operation 400 in FIG. 4 and in FIG. 5.

At operation 600, it is determined if the group belongs to another parent group 204. If the group does not belong to another parent group 204, it is proceeded to operation 602.

At operation 602, it is determined if the subgroup with a requesting EV was empty before and now has an EV charging. If not, at operation 604, it is determined if there was an EV charging in the subgroup 202 before, and now it is empty. If not, it is determined that there is no need for adjustment at operation 606, and the dynamic maximum currents remain unchanged.

Otherwise, it is proceeded to operation 608 to determine new dynamic maximum currents for each subgroup 202 that are in relation to at least one active charging station 200. The determination comprises comparing the original maximum current of each subgroup 202 in relation to at least one active charging station 200 and the evenly divided dynamic maximum current of the parent group 204 between the subgroups 202 that are in relation to the active charging stations 200. After the comparison, the maximum current with the lower value is selected for each subgroup 202 in relation to the at least one active charging station 200.

Based on the determination at operation 608, the new dynamic maximum current is set at operation 610 for each subgroup 202 in relation to at least one active charging station 200.

Figure 7:
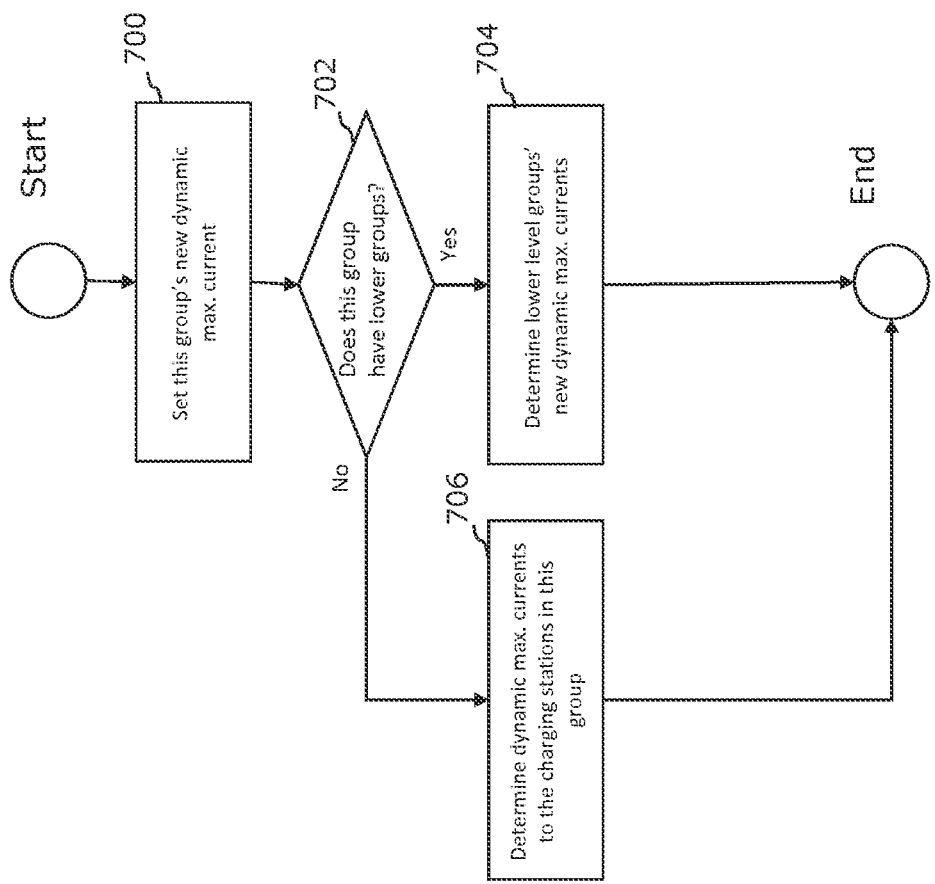
FIG. 7 illustrates a schematic representation of a process diagram of dynamic load management where new maximum currents are determined in a hierarchical structure according to an embodiment.

FIG. 7 illustrates a schematic representation of a process diagram of dynamic load management where new maximum currents are determined in a hierarchical structure according to another embodiment. After a dynamic maximum current of any group has been changed, new dynamic maximum currents for the group's subgroups, or for the active charging stations of the group, are determined. The group may therefore refer to either a parent group or a subgroup depending on the situation. Operations 608 and 408 correspond to the ones described in detail in the description of FIGS. 4-6, and are therefore omitted in the next section.

At operation 700, a group's new dynamic maximum current is set based on a determination initiated by a request of at least one new EV to start or stop charging. If the group has at least one subgroup 202, a new dynamic maximum current for the at least one subgroup 202 is determined at operation 608. If the group does not have at least one subgroup 202, new dynamic maximum currents are determined to the active charging stations 200 in the group at operation 408.

Next, the process of dynamic load management at different levels of the groups, and the structure of the levels, is described in more detail below. As illustrated in FIGS. 8-15, the computer device 100 may be configured to determine groups, and to control dynamic maximum currents of the groups and charging stations, as illustrated in FIGS. 8-15. The maximum currents provided for EVs can be controlled dynamically depending on their number, thus enabling providing the maximum charging power for each EV without exceeding capacities of the supply network.

Figure 8:
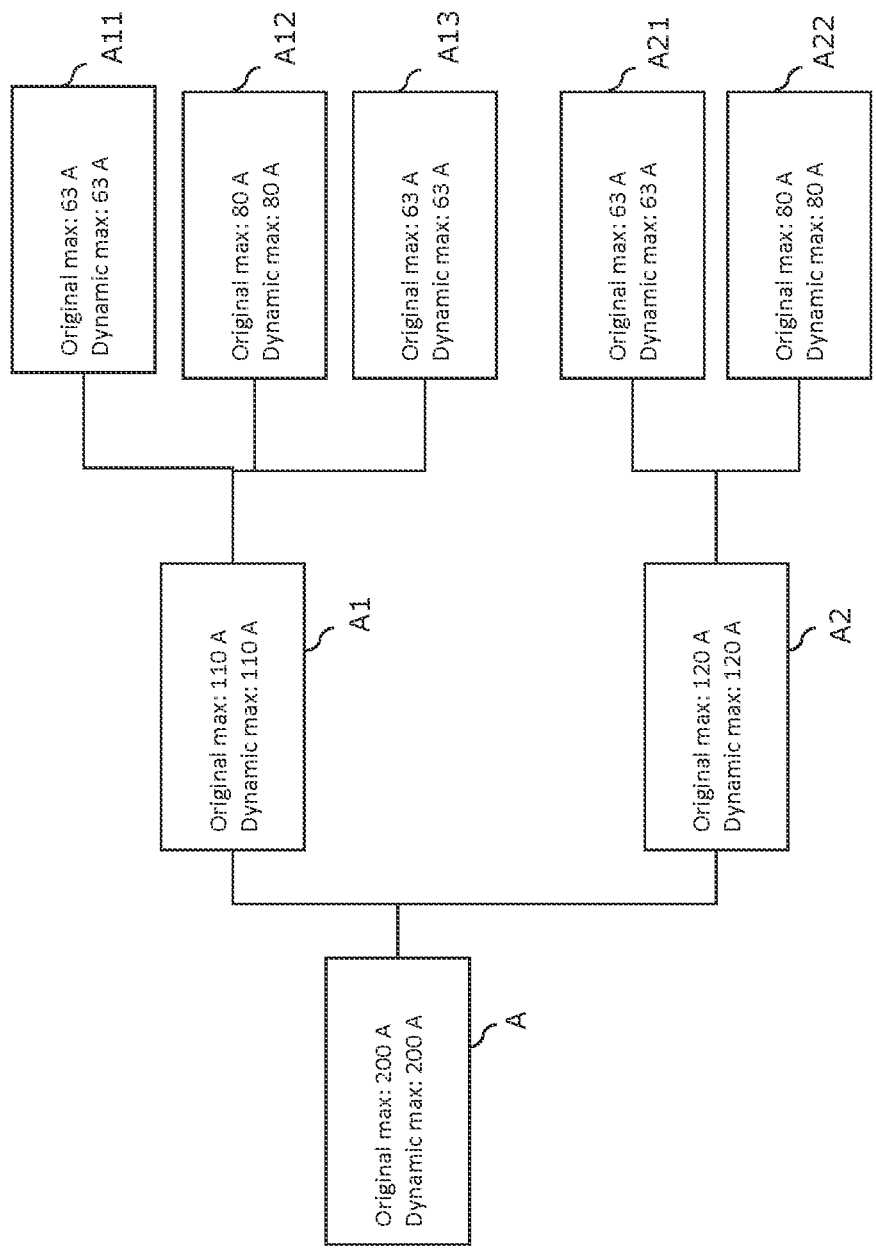
FIG. 8 illustrates a schematic representation of a block diagram of a hierarchical structure of groups according to an embodiment.

FIG. 8 illustrates a schematic representation of a block diagram of a hierarchy of groups according to an embodiment. The illustrated hierarchy of groups is only one possibility. There may be more or less groups at different levels, and also the original maximum currents may differ based on the determination. The term 'group' may refer to either a parent group or a subgroup, depending on the view point, as a same group may be both.

FIG. 8 illustrates a starting situation of dynamic load management, when there are no EVs charging in any charging station. Each of the groups A11, A12, A13, A21, A22 comprises at least one charging station (not shown in FIG. 8), each charging station being part of no more than one group. Further, groups A11, A12, A13 are grouped as group A1. Therefore, groups A11, A12, A13 are subgroups of group A1, which is a parent group for groups A11, A12, A13. Similarly, groups A21, A22 are grouped as group A2. Therefore, groups A21, A22 are subgroups of group A2, which is a parent group for groups A21, A22. Further, groups A1, A2 are grouped as group A. Groups A1, A2 are subgroups of group A, which is a parent group for groups A1, A2.

Each parent group may comprise at least one subgroup, and each subgroup may be part of only one parent group. For example, group A2 cannot comprise group A13, as it is already part of group A1. Each group may comprise an original maximum current and a dynamic maximum current. The original maximum current may be the maximum current capacity of each charging current and each group. The dynamic maximum current may depend on the number of charging EVs. When there are no charging EVs, the dynamic maximum current may have the same value as the original maximum current.

Figure 9:
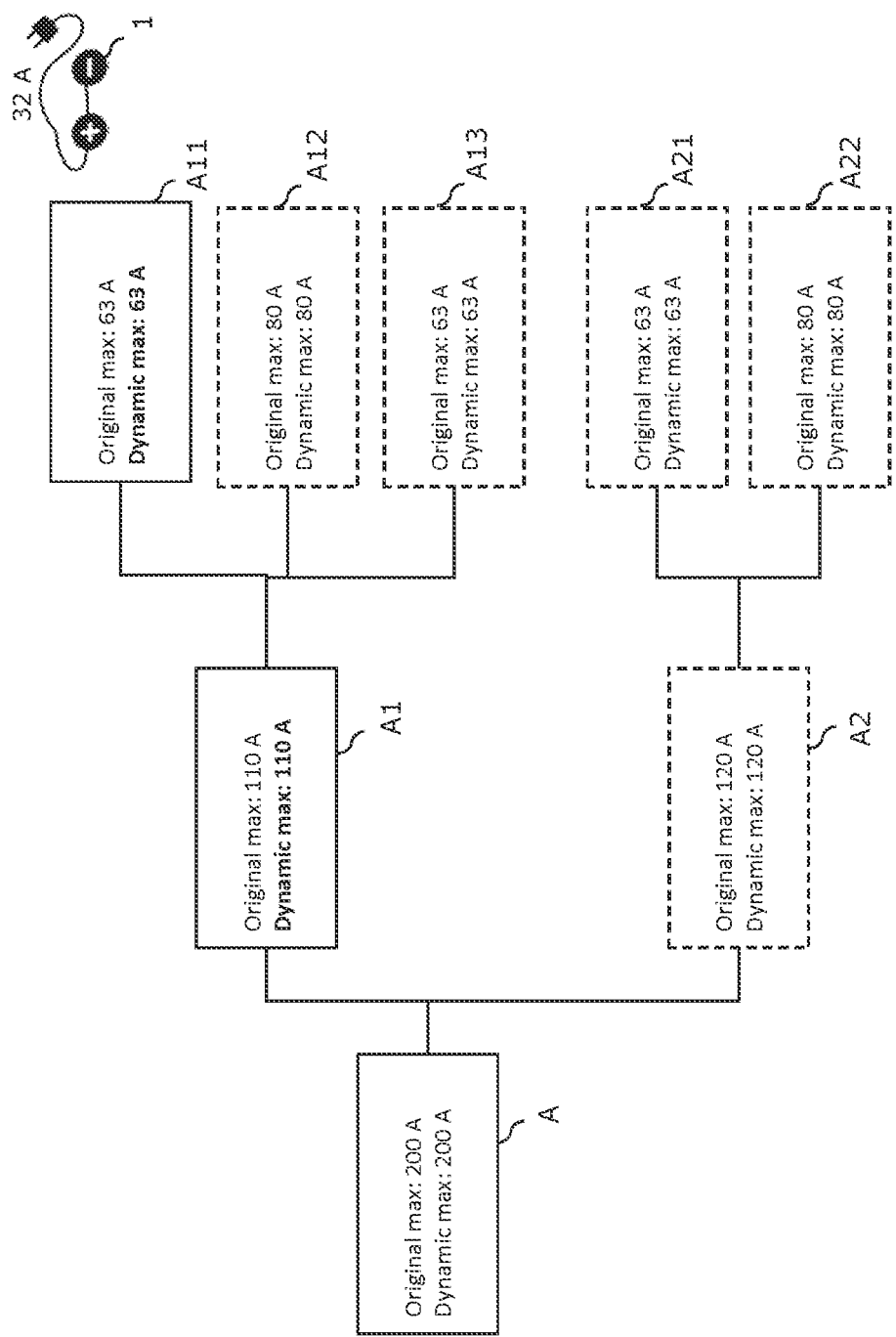
FIG. 9 illustrates a schematic representation of a block diagram of dynamic load management in a hierarchy of groups when a new electric vehicle requests to start charging according to an embodiment.

FIG. 9 illustrates a schematic representation of a block diagram of dynamic load management in a hierarchy of groups when a new electric vehicle requests to start charging according to another embodiment. In FIGS. 9-15, the groups comprising at least one active charging station, and further the parent groups in relation to the at least one active charging station, are illustrated with a solid line. The groups in which load is not being activated at the time are illustrated with a dashed line. For simplicity, charging stations are not shown in FIGS. 9-14. Each charging station is presumed to have an original maximum current of 32 A, which is the maximum charging current for EVs in the examples illustrated in FIGS. 9-15.

In FIG. 9, a new EV 1 has requested to start charging. In response to the request, determining if load needs to be adjusted is initiated. The charging station in which the EV 1 is requesting to start charging comprises in the group A11. Before the need for adjustment may be determined for the group A11 and the charging station, the need for adjustment is determined for the parent groups A1 and A. As the number of active charging stations has now changed in the subgroups in view of the parent groups A1, A, determining new maximum currents is initiated. The new dynamic maximum currents are determined for the charging station with the new EV, and to each group in relation to the active charging station. The dynamic maximum current of the parent group A is evenly divided between the subgroups in relation to at least one active charging station. Only the group A1 is in relation to the active charging station, so the whole dynamic maximum current of the parent group A is provided for the group A1. Because the original maximum current of the group A1 is lower than the provided maximum current, the original maximum current of the group A1 is set as the new dynamic maximum current. Further, the dynamic maximum current of the group A1 is evenly divided between the subgroups of the group A1 with at least one active charging station. Here, only the subgroup A11 has an active charging station, so the whole dynamic maximum current of the parent group A1 is provided for the subgroup A11. Because the original maximum current of the subgroup A11 is lower than the provided maximum current, the original maximum current of the subgroup A11 is set as the new dynamic maximum current. Because there are no other active charging stations in the group A11, and the current dynamic maximum current of the charging station with the EV 1 is lower than the new dynamic maximum current of the group A11, there is no need for adjustment, and the EV 1 charges with the maximum capacity.

Figure 10:
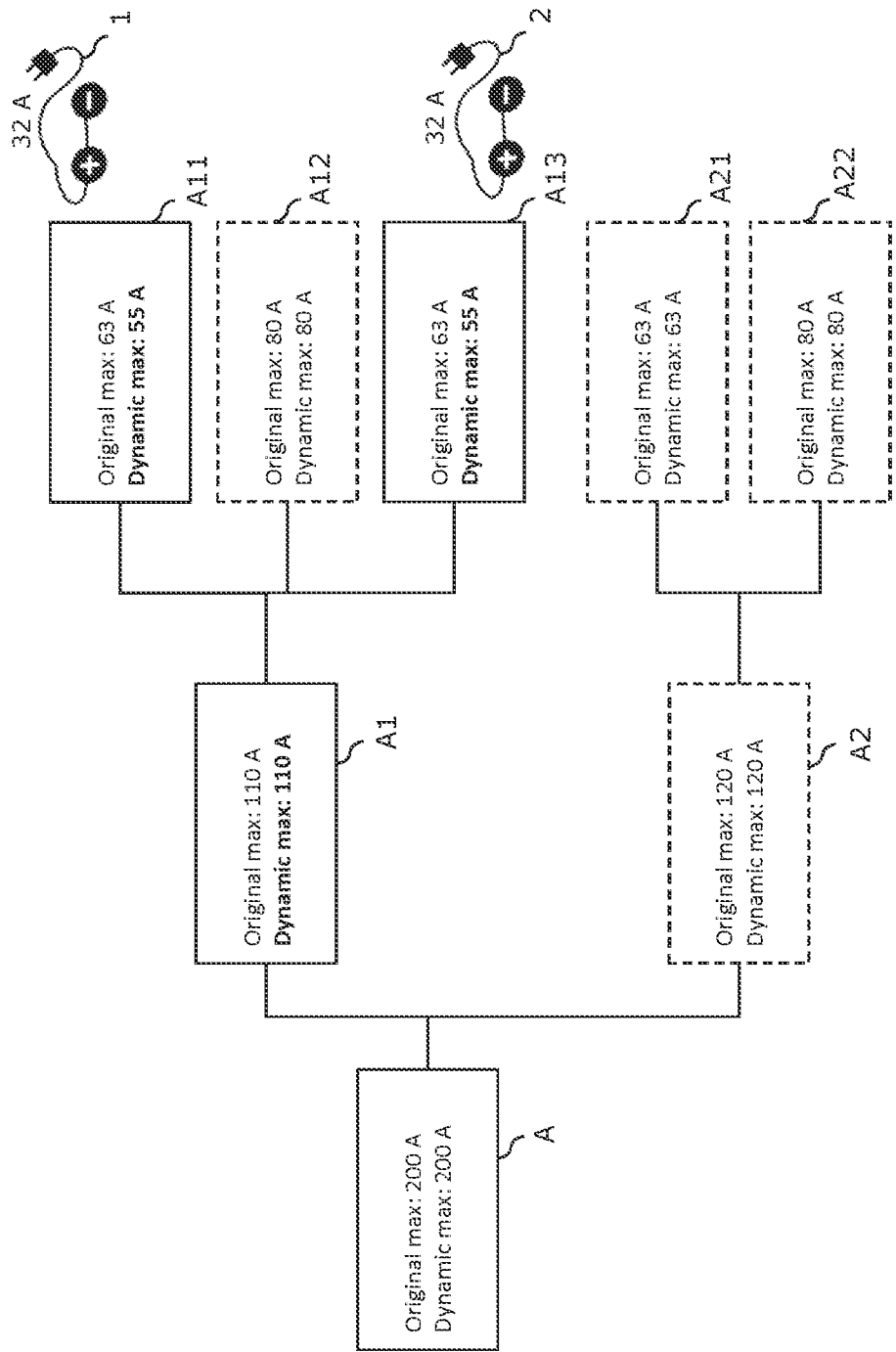
FIG. 10 illustrates a schematic representation of a block diagram of dynamic load management in a hierarchy of groups when another new electric vehicle requests to start charging according to an embodiment.

FIG. 10 illustrates a schematic representation of a block diagram of dynamic load management in a hierarchy of groups when another new electric vehicle requests to start charging according to an embodiment. As the number of EVs increases, the computer device 100 controls the maximum currents to ensure that the charging capacity of the network is balanced.

In FIG. 10, there is one EV 1 charging, and a new EV 2 requests to start charging. The active charging station with the EV 2 comprises in the group A13, which is part of the same parent group as the other group A11 with an active charging station. Therefore, the number of subgroups in relation to at least one active charging station has not changed in view of the parent group A, and no adjustment is needed. In view of the group A1, the number of subgroups with at least one active charging station is changed, as the group A1 now has two subgroups A11, A13 with at least one active charging station. Thus, the load needs to be adjusted for the subgroups. The dynamic maximum current of the parent group A1 is evenly divided between subgroups A11, A13 in relation to at least one active charging station. Now, the divided dynamic maximum current for the subgroups A11, A13 is lower than their original maximum currents, so the divided dynamic maximum current of the parent group A1 is set as the new dynamic maximum current for each subgroup A11, A13. Because there are no other active charging stations in the subgroups A11, A13, and the current dynamic maximum current of the charging stations with the EVs 1, 2 is lower than the new dynamic maximum currents of the subgroups A11, A13, there is no need for adjustment, and the EVs 1, 2 charge with the maximum capacity.

Figure 11:
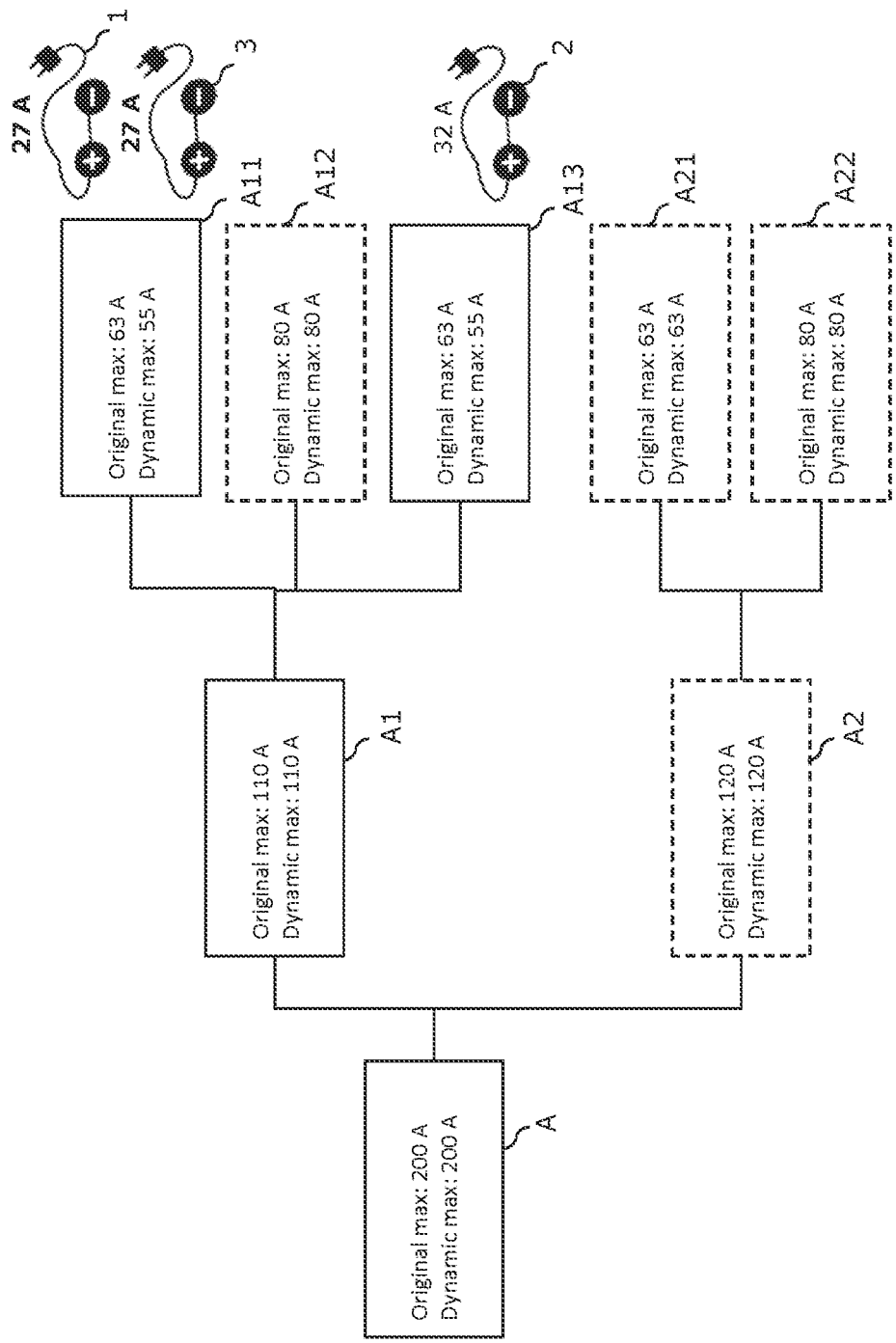
FIG. 11 illustrates a schematic representation of a block diagram of dynamic load management in a hierarchy of groups when another new electric vehicle requests to start charging according to another embodiment.

FIG. 11 illustrates a schematic representation of a block diagram of dynamic load management in a hierarchy of groups when another new electric vehicle requests to start charging according to another embodiment. As the number of EVs further increases, the computer device 100 controls the maximum currents to ensure that the charging capacity of the network is balanced.

In FIG. 11, there are two EVs 1, 2 charging, and a new EV 3 requests to start charging. The active charging station with the EV 2 belongs to the group A13, which is part of the same parent group as the other group, A11, now having two active charging stations with the EVs 1, 3. Therefore, the number of subgroups in relation to at least one active charging station has not changed in view of the parent group A, and no adjustment is needed for its subgroups. Also in view of the group A1, the number of subgroups with at least one active charging station remains unchanged, so there is no need for adjustment. However, because the number of active charging stations has changed within the group A11, and the value of the combined dynamic maximum currents of the charging station with the currently charging EV 1 and the charging station with the requesting EV 3 is bigger than the dynamic maximum current of the group A11, the power needs to be adjusted within the group's dynamic maximum current. The dynamic maximum current of the group A11 is evenly divided between the two active charging stations, and a new dynamic maximum current is set for each active charging station based on the comparison of each active charging station's original maximum current and the divided dynamic maximum current of the group A11, and the maximum current with the lower value is selected as the new dynamic maximum current for each active charging station. In this case, because the evenly divided dynamic maximum current of the group A11 is not an even number, the value is rounded down, and the rounded value is set as the new dynamic maximum current.

Figure 12:
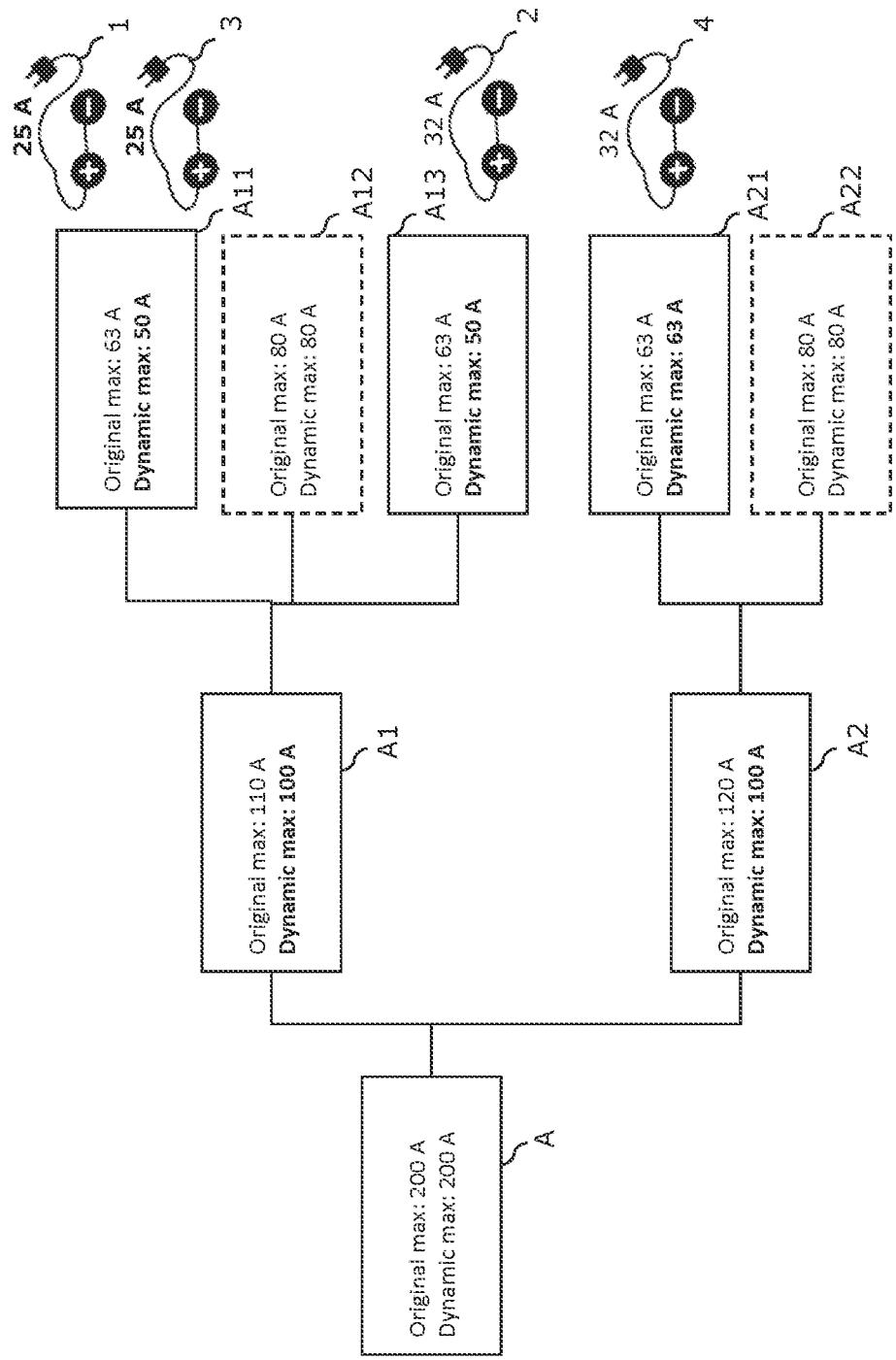
FIG. 12 illustrates a schematic representation of a block diagram of dynamic load management in a hierarchy of groups when another new electric vehicle requests to start charging according to another embodiment.

FIG. 12 illustrates a schematic representation of a block diagram of dynamic load management in a hierarchy of groups when another new electric vehicle requests to start charging according to another embodiment. As the number of EVs further increases, the computer device 100 controls the maximum currents to ensure that the charging capacity of the network is balanced.

In FIG. 12, there are three EVs 1, 2, 3 charging, and a new EV 4 requests to start charging. The active charging station with the EV 2 belongs to the group A13, which is part of the same parent group A1 as the group A11 having two active charging stations with the EVs 1, 3. In addition, there is now the new EV 4 requesting to start charging at a charging station which is part of the group A21, and in relation to the parent group A2 which is further part of the parent group A. Therefore, the number of subgroups in relation to at least one active charging station in view of the parent group A has now changed, and the load needs to be adjusted. The dynamic maximum current of the parent group A is now divided between subgroup A1 and subgroup A2, which are both in relation to at least one active charging station. The new dynamic maximum currents for each subgroup A1, A2 is determined by comparing their original maximum currents with the divided dynamic maximum current of the parent group A, and setting the one with the lower value as the new dynamic maximum current. Because both of the groups A1, A2 have subgroups, also the dynamic maximum currents of the subgroups of A1, A2 with at least one active charging station is adjusted.

The new dynamic maximum current of the parent group A1 is evenly divided with the subgroups A11 and A13, which both have at least one active charging station. The divided dynamic charging current is compared to the original maximum current of each of A11, A13, and the new dynamic maximum current is set based on the comparison by selecting the one with the lower value. Thereafter, it is determined if the load needs adjustment within the group with at least one active charging station. In the subgroup A11, the value of the combined dynamic maximum currents of the active charging stations is bigger than the dynamic maximum current of the group A11, and therefore, new dynamic maximum currents are determined for the active charging stations. In this case, the evenly divided maximum current of the subgroup A11 between the two charging stations with the EVs 1 and 3 is lower than the original maximum currents of the charging stations, so the evenly divided dynamic maximum current is set as their new dynamic maximum currents. In the subgroup A13, there is only one EV 2 charging, and the dynamic maximum current of the active charging station is lower than the dynamic maximum current of the subgroup A13, so there is no need for adjustment.

Because the parent group A2 now has a new dynamic charging current, a new dynamic charging current is determined also for its subgroups in relation to at least one active charging station. In this case, only the subgroup A21 has an active charging station with the EV 4. Thus, all of the dynamic maximum current of the group A2 is provided for the subgroup A21. The provided dynamic maximum current is compared to the original maximum current of the subgroup A21, and the one with the lower value is set as the new dynamic maximum current. Because there are no other active charging stations in the subgroup A21 than the one with the requesting EV 4, and the original maximum current of the charging station is lower than the dynamic maximum current of the subgroup A21, there is no need for adjustment, and the EV 4 is provided with the maximum current capacity.

Figure 13:
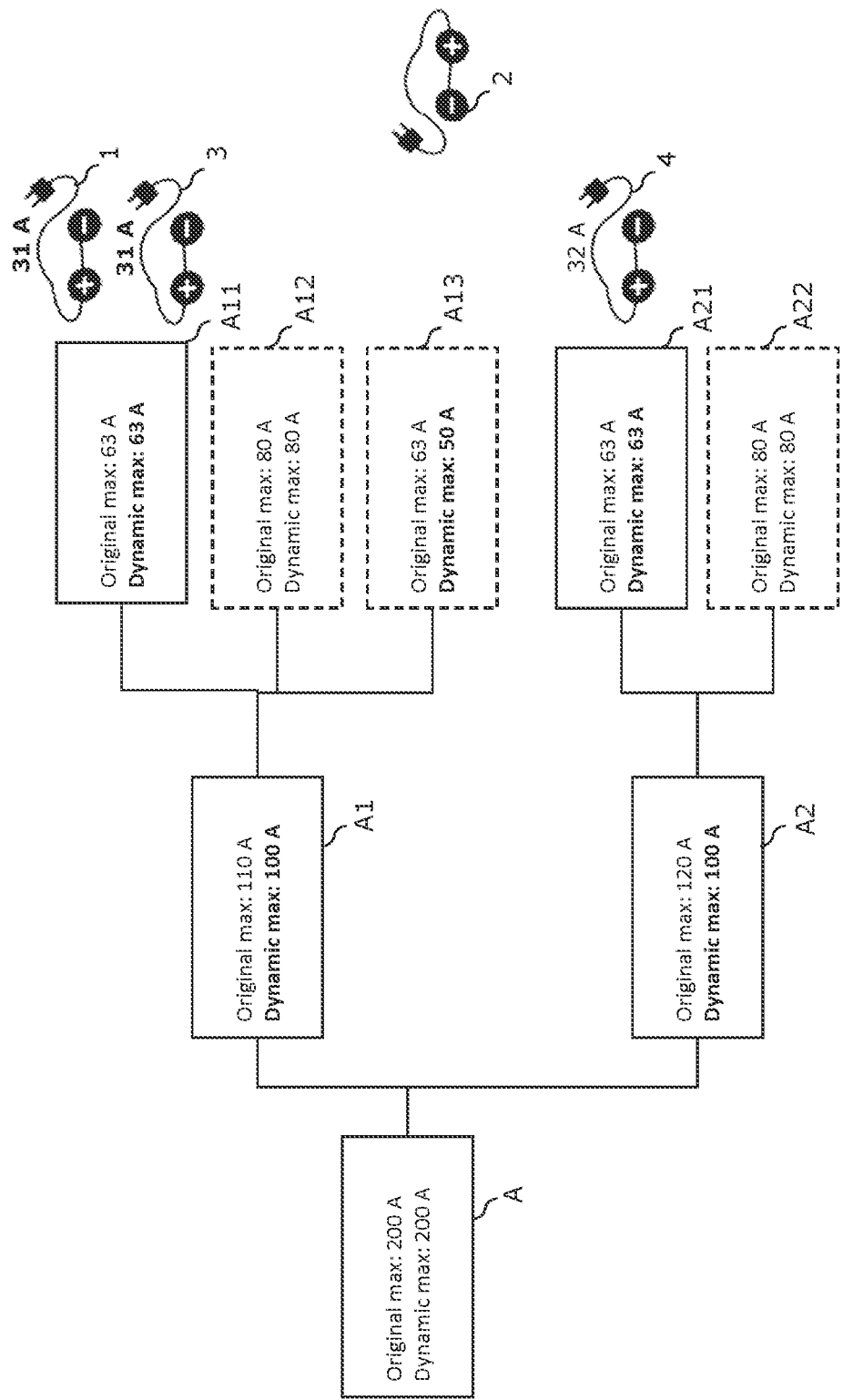
FIG. 13 illustrates a schematic representation of a block diagram of dynamic load management in a hierarchy of groups when a new electric vehicle requests to stop charging according to an embodiment.

FIG. 13 illustrates a schematic representation of a block diagram of dynamic load management in a hierarchy of groups when a new electric vehicle requests to stop charging according to an embodiment. As the number of EVs now decreases, the computer device 100 controls the dynamic maximum currents to ensure that the charging capacity of the network is balanced. More charging power may be provided for some EVs, depending on the changing capacities, when the overall number of the EVs decreases.

In FIG. 13, one of the EVs, EV 2, has requested to stop charging. As a result, the group A13 does not have any active charging stations anymore, and the number of subgroups in relation to at least one active charging station has changed in view of the parent group A1, and therefore the load needs adjustment. All of the dynamic maximum current of the parent group A1 is now provided to the only subgroup, group A11, which has at least one active charging station. Because the provided dynamic maximum current is bigger than the original maximum current of the subgroup A11, the original maximum current with the lower value is set as the new maximum current. As a result, also new dynamic maximum currents are determined for the active charging stations within the subgroup A11. The dynamic maximum current of the subgroup A11 is evenly divided for the active charging stations with vehicles 1, 3, and compared to the original maximum currents of the active charging stations. Now the divided dynamic maximum current has a lower value than the original maximum current of each active charging station, and thus the divided dynamic maximum current is set as the new dynamic maximum current for the active charging stations.

The number of active charging stations has not changed in the group A21, nor has the number of subgroups in relation to at least one active charging station of the parent groups A2, A, so no need for load adjustment is determined for the groups.

Figure 14:
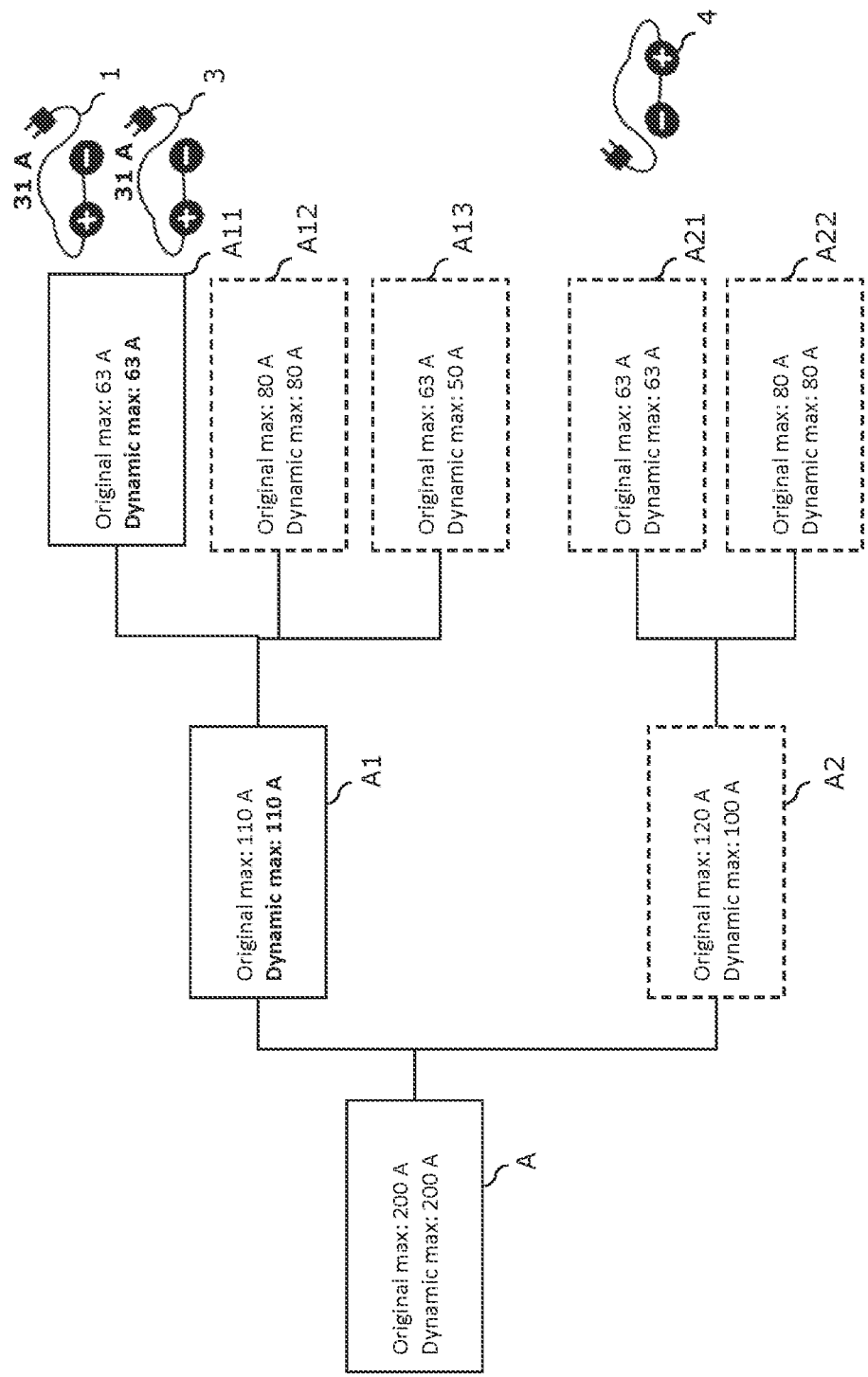
FIG. 14 illustrates a schematic representation of a block diagram of dynamic load management in a hierarchy of groups when another new electric vehicle requests to stop charging according to another embodiment.

FIG. 14 illustrates a schematic representation of a block diagram of dynamic load management in a hierarchy of groups when another new electric vehicle requests to stop charging according to an embodiment. The computer device 100 may adjust the load in response to the changed number of charging EVs.

In FIG. 14, EV 4 has requested to stop charging. Therefore, there is no longer any active charging station in the group A21, and the number of subgroups in relation to at least one active charging station has changed in view of the parent group A, and the load needs adjustment. Now the group A1 is the only subgroup in relation to at least one active charging station, so all of the dynamic maximum current of the parent group A is provided for the subgroup A1. Because the original maximum current of the group A1 has the lower value, the original maximum current is set as the new dynamic maximum current for the group A1. Further, a new dynamic maximum current is determined for the only subgroup of A1, group A11, with active charging stations. Again, because there are no other subgroups with at least one active charging station, all of the dynamic maximum current of the group A1 is provided for the subgroup A11. Since the original maximum current of the subgroup A11 has the lower value, the original maximum current is set as the new dynamic maximum current. The combined dynamic maximum currents of the active charging stations within the group A11 do not exceed the dynamic maximum current of the group A11, and thus there is no further need to adjust the load.

Figure 15:
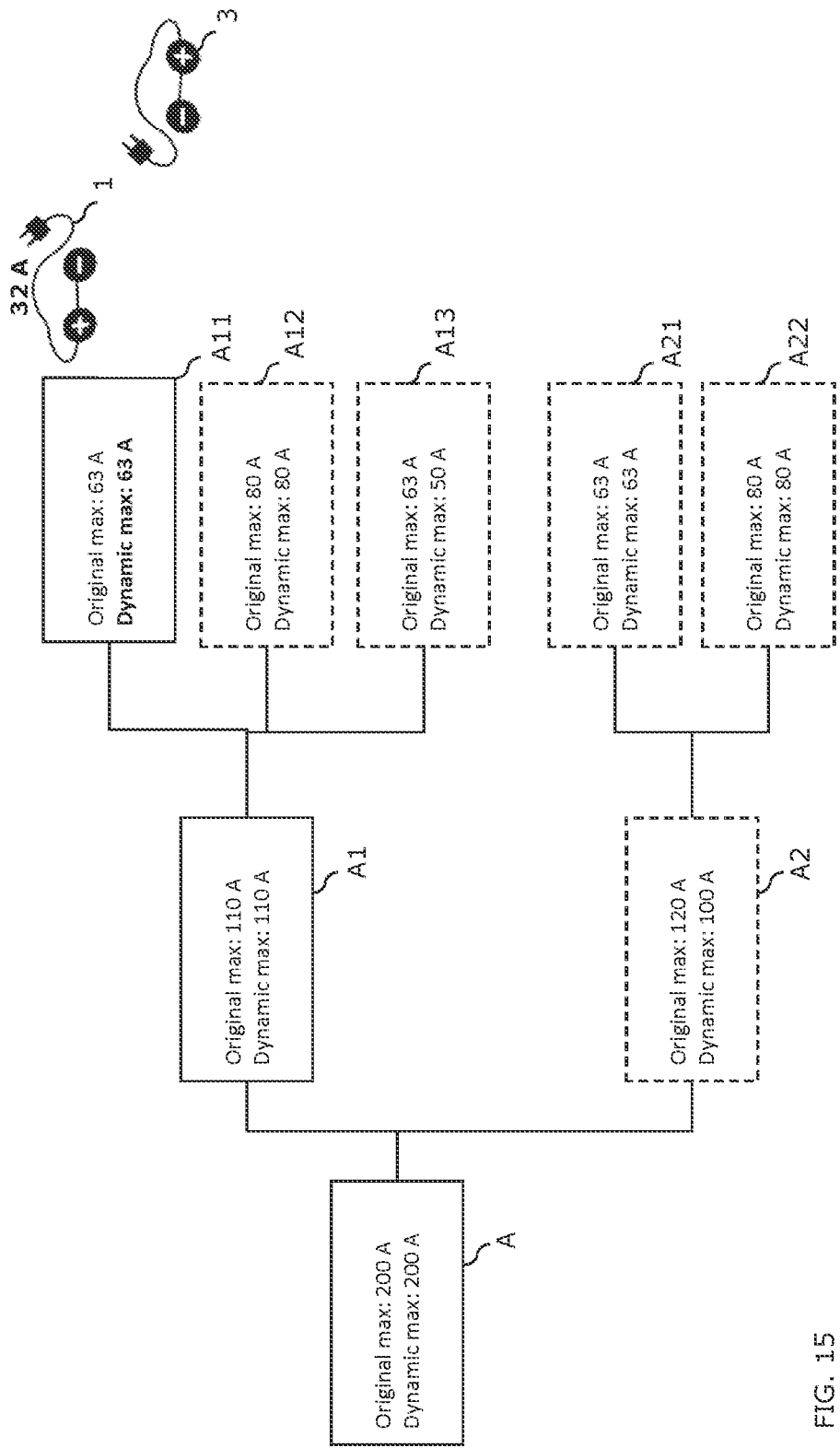
FIG. 15 illustrates a schematic representation of a block diagram of dynamic load management in a hierarchy of groups when another new electric vehicle requests to stop charging according to another embodiment.

FIG. 15 illustrates a schematic representation of a block diagram of dynamic load management in a hierarchy of groups when another new electric vehicle requests to stop charging according to an embodiment. The computer device 100 may adjust the load in response to the changed number of charging EVs, and provide the maximum current available for the remaining EV.

In FIG. 15, EV 3 has requested to stop charging. Since there is no change in the number of groups with at least one charging station, only the charging power within the group A11 needs to be adjusted. There is now only one active charging station in the group A11, so all of the dynamic maximum current is provided for the one active charging station. Because the provided dynamic maximum current is bigger than the original maximum current of the active charging station, the original maximum current is set as the new dynamic maximum current, and the charging current provided for the EV 1 increases.

The functionality described herein can be performed, at least in part, by one or more computer program product components such as software components. Any range or device value given herein may be extended or altered without losing the effect sought. Also any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items. The term 'and/or' may be used to indicate that one or more of the cases it connects may occur. Both, or more, connected cases may occur, or only either one of the connected cases may occur.

The steps of the methods described herein may be carried out in any suitable order, or simultaneously where appropriate. Additionally, individual blocks may be deleted from any of the methods without departing from the spirit and scope of the subject matter described herein. Aspects of any of the embodiments described above may be combined with aspects of any of the other embodiments described to form further embodiments without losing the effect sought.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A computer device comprising at least one processor and at least one non-transitory memory including computer program code, the at least one non-transitory memory and the computer program code configured to, with the processor, cause the computer device to at least:

control charging currents of at least a first charging station of an electric vehicle and at least a second charging station of at least one electric vehicle by an open charge point protocol (OCPP) and/or an open smart charging protocol (OSCP), wherein load of the charging currents is adjusted and determined in response to the at least one electric vehicle requesting start or stop charging;

the first and the second charging stations comprise a communication module so that the computer device is configured to operate based on the OCPP and/or the OSCP between the charging stations;

based on the OCPP and/or the OSCP, the computer device is configured to control the charging currents from the charging stations that are from different manufacturers, wherein the charging stations are wirelessly coupled to the computer device;

determine parent groups, each parent group comprising at least one subgroup, and each subgroup belonging to one parent group;

determine subgroups, each subgroup comprising at least one charging station, and each charging station belonging to one subgroup;

wherein each charging station, each subgroup and each parent group has an original maximum current and a dynamic maximum current, wherein the original maximum current comprises a maximum current capacity and the original maximum current is based on criteria other than a size of a fuse for determining the maximum current capacity, and the dynamic maximum current depends on the number of charging electric vehicles;

control charging currents by setting the dynamic maximum current so that for each charging station, each subgroup and each parent group the dynamic maximum current does not exceed the original maximum current; and control the charging currents further hierarchically so that the dynamic maximum current is determined first for each parent group, after determining the dynamic maximum current for each parent group the dynamic maximum current is determined for each subgroup, and after determining the dynamic maximum current for each subgroup, determining the dynamic maximum current for each charging station.

2. The computer device of claim 1, wherein the charging stations are situated at a different location than the computer device.

3. The computer device of claim 1, wherein the parent group comprising at least one subgroup is a subgroup to another parent group.

4. The computer device of claim 1, further configured to:
store data about active charging stations with the electric vehicles, and inactive charging stations without electric vehicles;
obtain information about at least one new electric vehicle requesting to at least one of start charging or stop charging, and an identity of the charging station with the requesting new electric vehicle;
update the data about active and inactive charging stations;
in response to the updated data, initiate determining if load needs to be adjusted; and
dispatch a confirmation of the request in response to the determination.

5. The computer device of claim 4, wherein determining the need for load adjustment is initiated for the parent group, wherein the determination comprises:
checking if a number of subgroups in relation to at least one active charging station has changed; and
in response to the changed number of subgroups in relation to at least one active charging station, initiating determining new dynamic maximum currents.

6. The computer device of claim 5, wherein determining the new dynamic maximum currents comprises:
comparing the original maximum currents of the subgroups in relation to at least one active charging station and the evenly divided dynamic maximum current of the parent group between the subgroups that are in relation to the active charging stations, and selecting the maximum current with a lower value for each subgroup in relation to the active charging stations; and
setting the new dynamic maximum current for each subgroup in relation to at least one active charging station based on the determination.

7. The computer device of claim 4, wherein determining the need for load adjustment comprises:
checking if there is at least one active charging station left in the group in which the new electric vehicle requested to stop charging; and
initiating determining new dynamic maximum currents for the active charging stations left in the group.

8. The computer device of claim 7, wherein determining the new dynamic maximum currents comprises:
comparing the original maximum currents of the active charging stations and an evenly divided dynamic maximum current of the group between the active charging stations of the group, and selecting the maximum current with a lower value for each active charging station; and
setting the new dynamic maximum current for each active charging station based on the determination.

9. The computer device of claim 4, wherein determining the need for load adjustment comprises:
checking the dynamic maximum current of the group in which the charging station with the electric vehicle requesting to start charging is located;
determining the combined dynamic maximum currents of the active charging stations currently charging the electric vehicles in the group;
checking the dynamic maximum current of the active charging station with the electric vehicle requesting to start charging; and
initiating determining new dynamic maximum currents for the active charging stations if the combined dynamic maximum currents of the active charging stations currently charging the electric vehicles and the dynamic maximum current of the active charging station with the electric vehicle requesting to start charging exceed the dynamic maximum current of the group.

10. A method for dynamic load management, the method comprising:
controlling charging currents of at least a first charging station of an electric vehicle and at least a second charging station of at least one electric vehicle by an open charge point protocol (OCPP) and/or an open smart charging protocol (OSCP), wherein load of the charging currents is adjusted and determined in response to the at least one electric vehicle requesting start or stop charging;
the first and the second charging stations comprise a communication module so that the computer device is configured to operate based on the OCPP and/or the OSCP between the charging stations;
based on the OCPP and/or the OSCP, controlling the charging currents from the charging stations that are from the different manufacturers, wherein the charging stations are wirelessly coupled to the computer device;
determining parent groups, each parent group comprising at least one subgroup, and each subgroup belonging to one parent group;
determining subgroups, each subgroup comprising at least one charging station, and each charging station belonging to one subgroup;
wherein each charging station, each subgroup and each parent group has an original maximum current and a dynamic maximum current, wherein the original maximum current comprises a maximum current capacity and the original maximum current is based on criteria other than a size of a fuse for determining the maximum current capacity, and the dynamic maximum current depends on the number of charging electric vehicles;

controlling charging currents by setting the dynamic maximum current so that for each charging station, each subgroup and each parent group the dynamic maximum current does not exceed the original maximum current; and controlling the charging currents further hierarchically so that the dynamic maximum current is determined first for each parent group, after determining the dynamic maximum current for each parent group the dynamic maximum current is determined for each subgroup, and after determining the dynamic maximum current for each subgroup, determining the dynamic maximum current for each charging station.

11. A computer program product comprising at least one non-transitory computer-readable storage medium having computer-executable program code instructions stored therein, the computer-executable program code instructions comprising program code instructions for:

controlling charging currents of at least a first charging station of an electric vehicle and at least a second charging station of at least one electric vehicle by an open charge point protocol (OCPP) and/or an open smart charging protocol (OSCP), wherein load of the charging currents is adjusted and determined in response to the at least one electric vehicle requesting start or stop charging;

the first and the second charging stations comprise a communication module so that the computer device is configured to operate based on the OCPP and/or the OSCP between the charging stations;

based on the OCPP and/or the OSCP, controlling the charging currents from the charging stations that are from the different manufacturers, wherein the charging stations are wirelessly coupled to the computer device;

determining parent groups, each parent group comprising at least one subgroup, and each subgroup belonging to one parent group;

determining subgroups, each subgroup comprising at least one charging station, and each charging station belonging to one subgroup;

wherein each charging station, each subgroup and each parent group has an original maximum current and a dynamic maximum current, wherein the original maximum current comprises a maximum current capacity and the original maximum current is based on criteria other than a size of a fuse for determining the maximum current capacity, and the dynamic maximum current depends on the number of charging electric vehicles;

controlling charging currents by setting the dynamic maximum current so that for each charging station, each subgroup and each parent group the dynamic maximum current does not exceed the original maximum current; and controlling the charging currents further hierarchically so that the dynamic maximum current is determined first for each parent group, after determining the dynamic maximum current for each parent group the dynamic maximum current is determined for each subgroup, and after determining the dynamic maximum current for each subgroup, determining the dynamic maximum current for each charging station.

* * * * *